Patented Feb. 23, 1954

2,670,293

UNITED STATES PATENT OFFICE 2,670,293

FOOD PRODUCT FLAVORING COMPOSITION AND METHOD OF PREPARATION THEREOF

Fortney H. Stark, Wauwatosa, Wis.

No Drawing. Application December 26, 1950,
Serial No. 202,807

17 Claims. (Cl. 99—140)

This invention relates to a food product flavoring compound and method of preparation thereof from a flavoring substance and a carrier therefor which enhances and enriches the flavor of such substance, without making its own flavor apparent in the compound.

Chocolate is an example of a flavoring material which is sometimes difficult to use to the best advantage. For many years, it has been the aim of control technicians in this field to impart to chocolate the rich combined flavors of milk and chocolate in a mix or concentrate which, when diluted with water, sugar, milk or other liquids would still retain the necessary strength of chocolate flavor, along with the delicate butter fat flavor. In all instances, however, when the concentration of cocoa or chocolate liquor is high enough to carry over substantially into the finished or diluted solution of syrup, chocolate milk, ice cream mix, custard, or otherwise, the amount of cocoa fat is so high as not only to be extremely expensive but to offer the well known disadvantages attendant upon the use of an excess of cocoa fat, these including decreased miscibility, complete loss of the desired "milk chocolate" taste, lack of creaminess, and a damping of other flavors.

The best technique heretofore known for dealing with this problem is to minimize the amount of cocoa fat actually used and to add, for flavor intensification, spices and other artificial flavors such as those authorized in Food and Drug Regulations, title 21, chapter I, part 14, as published in Federal Register December 6, 1944, 9 F. R. 14334–337. Where the flavoring compound is to be used in the manufacture of ice cream or other frozen products, the use of these ingredients raises further problems, since they tend to freeze and, when frozen, they do not create the desired taste response. In consequence, there are, on the market, chocolate flavored ice cream products in which the consumer can hardly tell except from the color that there is any chocolate present.

Another problem concerns viscosity or "substance" which in the past, has generally been obtained by adding milk solids, egg solids or starches. In all such cases, the introduction of these materials imposes arbitrary temperature limits which preclude desired cooking for pasteurization or otherwise because of the fact that cooking above specified temperatures will caramelize the sugars in the materials added. Through the use of the present invention, it becomes possible to pasteurize or otherwise cook or process a sugar-free component which, when added to the rest of the mix, gives the desired effect and permits wide latitude in heating without the development of caramelization or the formation of lactose-protein, dextrose-protein complexes, and other heat-reacting substances that produce the so-called cooked flavors.

Various expedients such as jet sterilizers and impacting devices have been in wide use in the industry for combining milk solids with cocoa or chocolate liquor for the manufacture of fudges and syrups without caramelizing the milk sugars normally present in such solids. These have involved an undesirable aerating effect with consequent loss of volatile flavoring materials present both in the milk and the chocolate components.

The present invention is based upon the discovery that cheese, and specifically a sharp, aged, hard type cheese, by preference, is capable of imparting smooth, buttery textures and richness to flavoring materials for which the cheese is used as a carrier, the original sharp flavor of the cheese itself being wholly submerged in the mixture. The result is obtained whether or not the flavor ingredient is chocolate, the above reference to chocolate being merely by way of example. Instances of other flavors for which cheese has been found particularly desirable as a carrier are such diverse flavoring materials as citrus fruit flavors and peanuts. The cheese is desirably pasteurized, further hydrated, and mixed with an emulsifier and is molten at the time of the addition of the flavoring material thereto.

The matter of viscosity or thickening which has been referred to above solely in connection with problems of heating is also significant in other respects. Conventionally known means of increasing the viscosity of food products, if successful, occasion other problems in the matter of pumping and handling the resulting material. The compound of the present invention will thicken properly when set and yet, when agitated, can be pumped freely and without the power or problems of cut-off which have heretofore been involved.

Also, particularly, where the flavoring ingredient is acid, as in the case of citrus fruits, it is difficult to accomplish any thickening without incurring the danger of curdling. The present invention completely solves this problem and permits any desired viscosity to be achieved without curdling and without requiring the use of such substances as pectin, although I may optionally add pectin in relatively minute quantities where citrus fruits and the like are the flavoring material. None whatever is needed in chocolate flavoring compounds and yet my improved chocolate flavoring compounds may and generally do have the consistency of a gelatinous product.

The matter of thickening is also closely related to the matter of flavor. In the case of all previously known thickening substances, the overall flavor effect has decreased almost in direct proportion to the amount of thickening material added, the thickening material being entirely inert as to flavor. In the case of the use of cheese as a thickening agent in accordance with the present invention, because of the peculiar faculty of the cheese for acting as a carrier for the esters which impart flavor, the cheese actually intensifies rather than weakens the flavor of the resulting compound. Moreover, it is possible to use very much less additive thickening material in the form of cheese than would be required by weight of any other thickening material that might be added.

It is of tremendous importance to the practical use of the present invention that the cheese thickens the compound without impairing shortness of body. It is the first time that the industry has ever had a flavoring compound which is thick and yet can be pumped and handled in mechanical filling and measuring devices without stringing and with the advantages of complete cut-off at the conclusion of each feeding or measuring operation.

When the improved flavoring compound is used in an ice cream mix, it has the further advantage of permitting the same amount of overrun or whip that the ice cream would have had without the addition of the chocolate flavoring compound. This has not been true of chocolate flavoring compounds previously known. It also eliminates the necessity for adding a stabilizer as has heretofore commonly been done. The addition of stabilizers is disadvantageous because of added cost and because any such stabilizer further weakens flavor.

The improved flavoring compound further covers or obscures the flavor of corn syrup which is prevalent in many of the syrups used for sweetening purposes. It permits egg solids to be used in the formulation whereas otherwise difficulty has been encountered in such use.

In preparing my improved compounds, I first select a suitable cheese. Hard type cheeses such as Swiss or cheddar cheese or the like are desirably, but not necessarily, used. Cream cheese is an example of a suitable soft cheese. There are many varieties of cheese which are particularly suitable, but I preferably avoid high acid cheeses, cooked cheeses and soft cheeses, these being much less desirable. The cheeses used are desirably those made from sweet curd.

The selected cheeses are desirably aged. The aging is usually accomplished naturally, although I may resort to the accelerated aging and flavor intensifying technique disclosed in my pending application Serial No. 753,470, now Patent No. 2,606,122, filed June 9, 1947, which materially lessens both the cost and length of time required and produces a more uniform product.

After the aged cheese is trimmed and cleaned, it is cut into small pieces by grinding or comminuting and it may be blended for uniformity but should produce as sharp and piquant a cheese flavor as the skill of the operator can command. It is then pasteurized in the usual manner in a jacketed kettle and moisture is desirably, though not necessarily, added with the usual emulsifier. The added moisture preferably raises the moisture level of the pasteurized cheese to a point above that of the natural cheese but less than 50% of the total. The moisture content is not critical.

The emulsifying agent, if used, is employed to enable the fat to be uniformly re-disbursed and held in suspension following pasteurization. In the case of well-aged cheese, the protein fraction is so broken down that emulsifying agents are not required. To the extent that all of the cheese is not so aged, I may use any of the well known emulsifying agents which are common in the preparation of process cheese, examples being: monosodium phosphate, disodium phosphate, dipotassium phosphate, trisodium phosphate, sodium meta phosphate (sodium hexameta phosphate), sodium acid pyrophosphate, tetra sodium pyrophosphate, sodium citrate, potassium citrate, calcium citrate, sodium tartrate in such quantity that the weight of the solids is not more than 3% of the weight of the cheese ingredient in the ground comminuted mixed mass.

It will be recognized that, thus far, the method employed is merely the method in common use in the preparation of pasteurized or process cheese or cheese spread and any one of such products can be used as a base for the further steps of my method.

At this point, I have three options:

I may immediately add to the molten cheese the flavoring material for which the cheese is to serve as a carrier, together with any other ingredient I may wish to have in the complete flavoring compound, thereby completing such compound at once; or I may store the cheese which has been thus prepared and incorporate the flavoring material and other ingredients therewith at a later date, the cheese being reheated to molten condition at the time the flavoring material and other ingredients are added; or I may add the flavoring material directly to the food product which is to be flavored thereby and add the melted cheese preparation to such food product directly, either before or following the addition of the flavoring material, in which case the cheese will nevertheless pick up the flavor-imparting esters of the flavoring material and intensify them and provide the shortness of body and concurrent thickening effect above noted.

I should also make it clear that it is not an essential of my process that the cheese be first converted into the product known as process cheese. I may, at any stage of the operation of making the completed food product, introduce natural cheese without previous processing, melting such cheese and preferably adding to the mix the desired amount of water and emulsifier. The reason why it is preferred to prepare the cheese preliminarily in the form of process cheese is for convenience in handling and the preparation of a product of uniform and known characteristic.

As examples of preferred formulae actually in commercial use, I give the following:

For a milk chocolate topping, or an ice cream fill such as is introduced in ribbons or unmixed discrete bodies in semi-frozen ice cream mix to make marbleized ice cream or the like, I use the following formula, all given porportions being by weight:

| | Per cent |
|---|---|
| Cane sugar | 21.7 |
| Cocoa powder | 21.75 |
| Cheese | 17.4 |
| Water | 39.1 |

For a milk chocolate compound which is incorporated throughout the body of ice cream mix to make a chocolate flavored ice cream, I have used the following formula:

| | Per cent |
|---|---|
| Corn syrup | 20.8 |
| Cane sugar | 20.8 |
| Sweetened condensed milk | 8.16 |
| Cocoa powder | 8.16 |
| Cheese | 8.16 |
| A stabilizer, preferably of the Irish moss type, such as that commercially known as "Dariloid" | .67 |
| Water | 32.85 |

It is a unique quality of the flavoring compound above stated that it can be used cold to be incorporated instantly in ice cream mix, whereas it is believed to be true of every competitive product that the chocolate flavoring compound must either be heated or added to heated mix, instead of being incorporated cold as is possible with the present product. In the case of competitive products, they require intense agitation, for long periods, even when heated, whereas my improved flavoring compound can be incorporated virtually instantly without more agitation than is required to distribute it in the mix. Quite apart from all of its other advantages, the elimination of the need for heating and intensive agitation involves tremendous savings in cost from the standpoint of the ice cream manufacturer.

The following formula is used for a lemon flavoring compound:

| | Per cent |
|---|---|
| Essential oil of lemon | 0.25 |
| Citric acid | 0.90 |
| Corn syrup (85% solids) | 25.00 |
| Sugar | 30.00 |
| Cheese | 7.50 |
| Sweetened condensed skim milk | 6.75 |
| Pectin | 1.25 |
| Water | 28.35 |

(Vegetable color added)

This compound has been used commercially by mixing it with ice cream and with custard mixes, in each of which it blends immediately while cold, just as does the chocolate formula given above. It has also been used, without change, to be introduced, unmixed, into a semi-frozen ice cream mix to make lemon marbleized ice cream. It has also been used in lemon pies, wherein it has very great advantages over any other flavoring material in that a lemon filling made with my improved flavoring compound can be frozen and thawed without in any way affecting the emulsion or the flavor. It is not safe to store ordinary lemon pies unless they are frozen and the ordinary lemon pie filling cannot be frozen without separation of the emulsion and formation of crystals, both of which make it unsatisfactory for future sale or use.

In using my flavoring compound in lemon pies, it is sometimes mixed with the other elements of the conventional custard filling, in which case it is used solely for flavoring, or it may be incorporated as a layer in the pie without admixture with the rest of the filling, or it may comprise the entire filling within the pie shell.

In all of my products which are to be used in foods which are frozen, whether or not they are consumed while frozen (and particularly if they are consumed while frozen) it is of tremendous importance that the flavoring compounds incorporating my invention can be frozen and thawed without breakdown of emulsion and their thawing rate happens to coincide substantially with the thawing rate of the products in which they are incorporated.

From the standpoint of expense, it is significant that the total amount of water in a product made up according to the foregoing formulae is nearly double the amount of water which is present in the previously known flavoring compounds for which the compounds of my invention are substituted. Yet, despite the great increase in the percentage of water, my compounds are equal to or greater in viscosity and shortness than the products for which they are substituted and in all instances are greatly more intense in flavor, thus giving an increase in flavoring capacity despite the increase in water. On the market, products incorporating the present invention have commanded a price which is approximately double the price of competitive products, principally because of the fact that only about half as much of the products of this invention are required to produce a given flavoring effect. To the given effect of the added flavoring material, however, the products of my invention add a richness and creaminess and buttery flavor which is impossible to achieve with any amount of competitive product, regardless of how much is used.

In the manufacture of chocolate ice cream, the flavoring compound is ordinarily used in such proportions that it will amount to about 6 to 10% by weight of the total flavored ice cream mix. In the case of marbleized ice cream, the flavoring compound as above given is used without addition of any mixed ingredients. The lemon compound may also be so used.

It will be understood that the actual proportions of cheese both with reference to the amount of flavoring material used and with reference to the total of the food product resulting from the addition of my flavoring compound may be varied within wide limits. If the cheese is extremely sharp, I may want to use not more than 20% cheese in the total food compound, whether this be taken to be the flavored ice cream mix or the chocolate fill used in the marbleized or variegated ice cream. However, by selecting very bland cheese such as cream cheese or incompletely cured American brick or Swiss cheeses, I may have as much as 50% cheese, or even more, in the completed product. It should be noted that where such large proportionate quantities of cheese are employed, the purpose would be to secure viscosity benefits and the like rather than flavor intensification.

It is desired to note that for ordinary flavor intensification purposes the amount of cheese added would normally fall within the ranges given for the addition of milk fats and solids in the food and drug regulations above identified, particular reference being made to sections 14.2 to 14.9, 14.11 and 14.12.

In the foregoing formulae using chocolate flavor, reference made to cocoa refers to ground cocoa product as distinguished from chocolate liquor, which includes cocoa fat and spices. While, for some purposes, the chocolate liquor is equivalent to cocoa, it is not desired to use chocolate liquor for the purposes of the present invention because it contains ingredients that are deleterious to the desired flavor result.

Regardless of the order in which the ingredients are introduced into the mixture with each other or with the food product to be flavored, it has been found that in any case the flavoring material esters become adsorbed upon the cheese carrier and the flavoring materials become substantially homogeneously distributed throughout the cheese which, in turn, is readily miscible with the food ingredients in which it may be incorporated, if not used separately as a topping or filling.

Moreover, the colloidal structure of cheese presents enormous surface forces in the suspended fat and protein for the adsorption of the odor and flavor of the admixed flavoring material. Consequently, the flavor of the cheese itself is completely submerged and that of the flavoring material greatly accentuated.

I claim:

1. A food product additive comprising a flavoring material and a colloidal cheese carrier having a continuous phase and a discontinuous phase comprising suspended fat on which the said flavoring material is homogeneously adsorbed, the flavoring material and cheese carrier being present in such relative proportions that only the flavor of the flavoring material is separately perceptible, the cheese flavor being wholly obscured.

2. The product defined in claim 1 in which the flavoring material comprises chocolate.

3. The product of claim 1 in which the flavoring material comprises a citrus fruit flavor.

4. The product of claim 1 in which the cheese comprises a hard cheese.

5. The product of claim 1 in which the flavoring material comprises peanut butter.

6. A flavoring composition comprising an emulsified cheese carrier comprising suspended fat and protein and a flavoring material for the flavor esters of which the suspended fat and protein of the cheese serves as a carrying vehicle, such flavoring material being present throughout the cheese in quantities sufficient to obscure any independent cheese flavor and the cheese serving only to accentuate and carry the flavor of such material.

7. A viscous, short-bodied food flavoring composition comprising a process cheese base and carrier having an included emulsifier whereby the fat in the cheese is suspended and flavoring material of a type foreign to cheese added to said process cheese and distributed therethrough in sufficient quantity so that the flavor of such flavoring material is adsorbed on the suspended fat to wholly dominate and obscure the flavor of the cheese, the presence of the cheese not being detectable by taste.

8. The product set forth in claim 7 in which the flavoring material comprises chocolate.

9. The product of claim 7 in which the flavoring material comprises a citrus fruit flavor.

10. The product of claim 7 in which the flavoring material comprises peanut butter.

11. A method of flavoring a food to impart high flavor concurrently with viscosity and short body which method comprises the addition with the desired flavoring material of a quantity of emulsified cheese having suspended fat sufficient to constitute a carrier for the flavor esters of the flavoring material but insufficient to impart any cheese flavor to such product.

12. The method recited in claim 11 which comprises the step of melting the cheese, the flavoring material and cheese being added together at a time when the cheese is molten.

13. The method of claim 12 in which the cheese is melted and the flavoring material added thereto prior to the addition of the flavoring material and the cheese to the food product which is to be flavored.

14. A food product additive comprising a flavoring material and an emulsified carrier comprising cheese having a continuous phase and a discontinuous phase comprising suspended fat, the said material being homogeneously adsorbed on said fat, the flavoring material and emulsified carrier being present in such relative proportions that only the flavor of the flavoring material is separately perceptible, the flavor of the emulsified carrier being wholly obscured.

15. The product defined in claim 14 in which the flavoring material comprises chocolate.

16. The product of claim 14 in which the flavoring material comprises a citrus fruit flavor.

17. The product of claim 14 in which the flavoring material comprises peanut butter.

FORTNEY H. STARK.

References Cited in the file of this patent

UNITED STATES PATENTS

| Number | Name | Date |
|---|---|---|
| 1,735,510 | Shostak | Nov. 12, 1929 |
| 1,957,789 | Lyons et al. | May 8, 1934 |
| 1,984,470 | Farrell | Dec. 18, 1934 |
| 2,323,466 | Griffith | July 6, 1943 |

FOREIGN PATENTS

| Number | Country | Date |
|---|---|---|
| 484,791 | Great Britain | May 10, 1938 |